US012681850B2

(12) United States Patent
   Rudraprakash et al.

(10) Patent No.: US 12,681,850 B2
(45) Date of Patent: Jul. 14, 2026

(54) TRANSFORMING LEGACY UEFI FIRMWARE TO UNIVERSAL SCALABLE FIRMWARE

(71) Applicant: Dell Products L.P., Round Rock, TX (US)

(72) Inventors: Gowrishankar Rudraprakash, Bangalore (IN); Shekar Babu Suryanarayana, Bangalore (IN); Dayananda Angadi, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 313 days.

(21) Appl. No.: 18/632,976

(22) Filed: Apr. 11, 2024

(65) Prior Publication Data

US 2025/0321880 A1      Oct. 16, 2025

(51) Int. Cl.
   *G06F 12/02*      (2006.01)
   *G06F 21/57*      (2013.01)

(52) U.S. Cl.
   CPC ........ *G06F 12/0238* (2013.01); *G06F 21/572* (2013.01)

(58) Field of Classification Search
   CPC ........................... G06F 12/0238; G06F 21/572
   See application file for complete search history.

(56) References Cited

U.S. PATENT DOCUMENTS

| | | | | | |
|---|---|---|---|---|---|
| 7,047,448 | B2 * | 5/2006 | Rao | ..................... | G06F 11/1433 |
| | | | | | 717/124 |
| 7,694,291 | B2 * | 4/2010 | Chen | ......................... | G06F 8/71 |
| | | | | | 717/169 |
| 9,069,641 | B2 * | 6/2015 | Parry | ........................ | G06F 8/65 |
| 9,122,540 | B2 * | 9/2015 | Dhoolia | .................... | G06F 8/51 |
| 9,804,946 | B2 * | 10/2017 | Conlon | ................... | G06F 8/433 |
| 2006/0143598 | A1 * | 6/2006 | Zimmer | ..................... | G06F 8/51 |
| | | | | | 717/136 |
| 2008/0109798 | A1 * | 5/2008 | Gavens | ..................... | G06F 8/65 |
| | | | | | 717/168 |
| 2016/0224339 | A1 * | 8/2016 | Zhang | ................... | G06F 16/258 |
| 2021/0124573 | A1 * | 4/2021 | Yu | ........................... | G06F 8/433 |
| 2022/0027138 | A1 * | 1/2022 | Stevens | ..................... | G06F 8/65 |
| 2025/0156384 | A1 * | 5/2025 | Rajagopalan | ........... | H04L 51/02 |
| 2025/0165162 | A1 * | 5/2025 | Jung | .................... | G06F 3/0619 |
| 2025/0217126 | A1 * | 7/2025 | Hicks | ................. | G06F 11/3604 |

* cited by examiner

*Primary Examiner* — Douglas M Slachta

(74) *Attorney, Agent, or Firm* — Jackson Walker L.L.P.

(57)                ABSTRACT

Disclosed systems and methods perform firmware transformation operations to transform legacy firmware to USF firmware. Legacy firmware information, corresponding to legacy firmware suitable for an information handling system, is retrieved or otherwise accessed and based on the legacy firmware information, one or more firmware complexities of the legacy firmware are determined. A USF transformation protocol is invoked to identify the firmware complexities in the legacy firmware and generate USF firmware that complies with a USF specification and resolves at least some of the complexities in the legacy firmware. An image of the USF firmware is stored in nonvolatile storage of the information handling system. Embodiments include a simplified ACPI interface with split architecture support and a silicon-agnostic embedded abstraction module to achieve USF compatibility across various heterogeneous boot loaders.

20 Claims, 4 Drawing Sheets

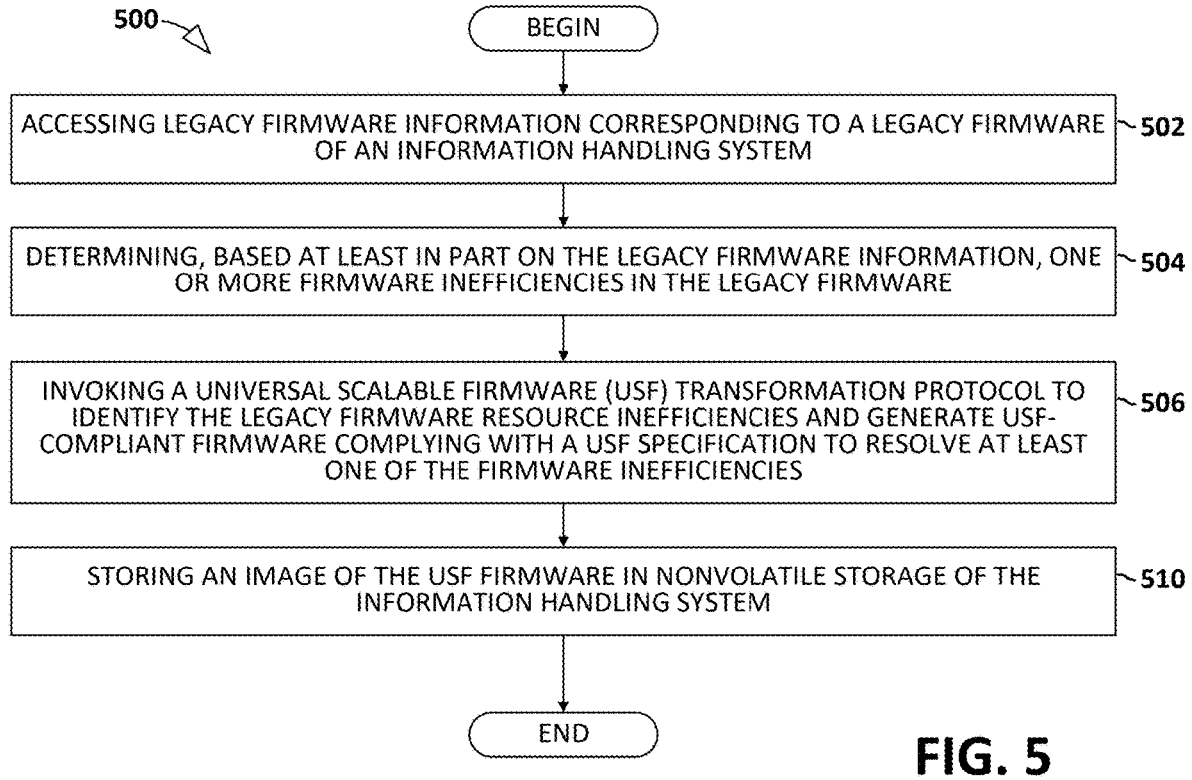

500

BEGIN

ACCESSING LEGACY FIRMWARE INFORMATION CORRESPONDING TO A LEGACY FIRMWARE OF AN INFORMATION HANDLING SYSTEM — 502

DETERMINING, BASED AT LEAST IN PART ON THE LEGACY FIRMWARE INFORMATION, ONE OR MORE FIRMWARE INEFFICIENCIES IN THE LEGACY FIRMWARE — 504

INVOKING A UNIVERSAL SCALABLE FIRMWARE (USF) TRANSFORMATION PROTOCOL TO IDENTIFY THE LEGACY FIRMWARE RESOURCE INEFFICIENCIES AND GENERATE USF-COMPLIANT FIRMWARE COMPLYING WITH A USF SPECIFICATION TO RESOLVE AT LEAST ONE OF THE FIRMWARE INEFFICIENCIES — 506

STORING AN IMAGE OF THE USF FIRMWARE IN NONVOLATILE STORAGE OF THE INFORMATION HANDLING SYSTEM — 510

END

FIG. 5

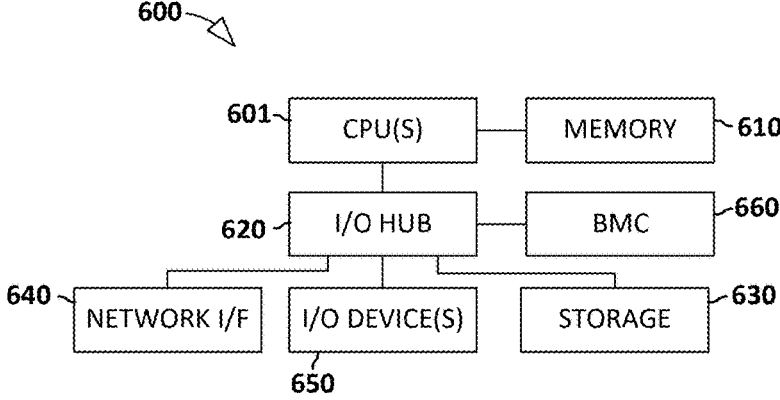

600

601 — CPU(S)     MEMORY — 610

620 — I/O HUB     BMC — 660

640 — NETWORK I/F     I/O DEVICE(S)     STORAGE — 630

TRANSFORMING LEGACY UEFI FIRMWARE TO UNIVERSAL SCALABLE FIRMWARE

TECHNICAL FIELD

The present disclosure is in the field of information handling systems and, more specifically, firmware and firmware architectures for such systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Many information handling systems include one or more persistent storage devices containing specialized executable code generally referred to as firmware. Firmware may implement low-level functions for one or more of the system's specific hardware components and expose hardware abstractions to operating systems and other higher-level software.

A large installed base of information handling systems includes firmware provisioned in compliance with the Universal Extensible Firmware Interface (UEFI) standard maintained by the UEFI Forum. UEFI firmware is typically stored in one or more firmware volumes (FVs). For purposes of this disclosure, the term legacy UEFI firmware encompasses UEFI firmware in which the FVs are formatted in accordance with a Firmware File System (FFS) that describes the organization of files within the FVs and complies with a FFS specification such as the Intel® Platform Innovation Framework for EFI Firmware File System Specification Version 0.9 (Intel 2003) or subsequent versions or equivalents. Accordingly, legacy UEFI firmware, which may be referred to herein as FFS-compliant firmware or, more simply, FFS firmware, includes FVs formatted in compliance with a FFS that describes the organization of files within the FVs.

Legacy UEFI/BIOS firmware may include multiple FVs, nested FVs, peripheral CPU device firmware updates (PCDs), configuration patch tables, Pre-EFI Initialization (PEI)-to-(Driver Execution Environment (DXE) handoff blocks (HOBs), etc., any or all of which may be tightly coupled and interdependent. Universal Scalable Firmware (USF) is at least partially intended to address and simplify such complexities. Unfortunately, the massive effort required to successfully transition from a legacy UEFI/BIOS environment to a USF-compatible BIOS presents a significant barrier.

SUMMARY

Common problems associated with complexities in legacy UEFI/BIOS firmware architectures are addressed by disclosed subject matter for transforming legacy UEFI/BIOS firmware to a USF-compliant firmware. Disclosed features for a disclosed firmware transformation framework include a seamless transformation protocol, referred to herein as the FFS-to-USF Transformation Protocol (FTP), that dynamically learns an offline FFS structure and evaluates boot time load and link dependencies to enable automated seamless transformation of legacy FFS to modern USF. Embodiments of the FTP may work in combination with a Silicon Package Transformation (SPT) module that is agnostic to the silicon on chip (SoC), i.e., hardware, and supports dynamic integration of various silicon-vendor and third party firmware packages over an original equipment manufacturer (OEM) Embedded Abstraction Module to achieve USF compatibility across various heterogeneous boot loaders. To ensure support for split architecture multistore flash images for update, recover, and boot, disclosed systems may implement a simplified Advanced Configuration and Power Interface (ACPI) interface.

In some embodiments, a disclosed FTP transforms a legacy FFS platform into a USF-compliant platform with reduced boot time and smaller Serial Peripheral Interface (SPI) flash footprint. The FTP may beneficially reduce firmware development costs and minimize the amount of manual effort required to complete a transformation.

The simplified ACPI interface disclosed herein may provide a multi-store USF layout and ensure seamless boot and update and recover capabilities.

In at least one aspect, disclosed systems and methods perform firmware transformation operations to transform legacy firmware to USF firmware. Legacy firmware information, corresponding to legacy firmware suitable for an information handling system, is retrieved or otherwise accessed and based on the legacy firmware information, one or more firmware complexities of the legacy firmware are determined. A USF transformation protocol is invoked to identify the firmware complexities in the legacy firmware and generate USF firmware that complies with a USF specification and resolves at least some of the complexities in the legacy firmware. An image of the USF firmware is stored in nonvolatile storage of the information handling system. Embodiments include a simplified ACPI interface with split architecture support and a silicon-agnostic embedded abstraction module to achieve USF compatibility across various heterogeneous boot loaders.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIG. 5 depicts a flow diagram of a firmware transformation method; and

FIG. 6 illustrates an information handling system suitable for use in conjunction with disclosed firmware transformation features.

DETAILED DESCRIPTION

Figure 1:
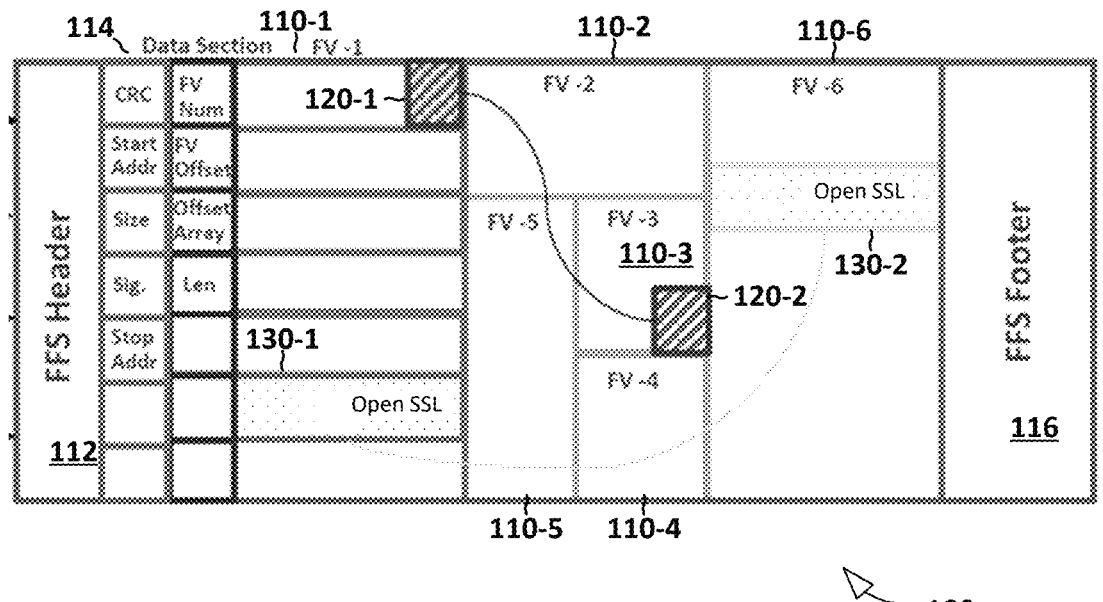
FIG. 1 illustrates an example layout for legacy firmware.

Exemplary embodiments and their advantages are best understood by reference to FIGS. 1-6, wherein like numbers are used to indicate like and corresponding parts unless expressly indicated otherwise.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU"), microcontroller, or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

Additionally, an information handling system may include firmware for controlling and/or communicating with, for example, hard drives, network circuitry, memory devices, I/O devices, and other peripheral devices. For example, the hypervisor and/or other components may comprise firmware. As used in this disclosure, firmware includes software embedded in an information handling system component used to perform predefined tasks. Firmware is commonly stored in non-volatile memory, or memory that does not lose stored data upon the loss of power. In certain embodiments, firmware associated with an information handling system component is stored in non-volatile memory that is accessible to one or more information handling system components. In the same or alternative embodiments, firmware associated with an information handling system component is stored in non-volatile memory that is dedicated to and comprises part of that component.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically. Thus, for example, "device 12-1" refers to an instance of a device class, which may be referred to collectively as "devices 12" and any one of which may be referred to generically as "a device 12".

As used herein, when two or more elements are referred to as "coupled" to one another, such term indicates that such two or more elements are in electronic communication, mechanical communication, including thermal and fluidic communication, thermal, communication or mechanical communication, as applicable, whether connected indirectly or directly, with or without intervening elements.

Referring now to the drawings, FIG. 1 illustrates an example of a firmware implementation, referred to herein as legacy firmware 100, that complies with a mature and widely deployed firmware solution. In this detailed description of exemplary embodiments, legacy firmware 100 may be implemented as legacy UEFI firmware. As used herein, the term legacy UEFI firmware may refer to UEFI firmware implemented with firmware volumes formatted in compliance with the FFS specification. The legacy firmware 100 of FIG. 1 includes an FFS header 112, a data section 114, an FFS footer 116, and one or more FFS-compliant firmware volumes 110, six of which are illustrated in FIG. 1 as FV1 110-1, FV2 110-2, . . . and FV6 110-6.

Legacy firmware 100 includes one or more features, aspects, or characteristics that are sub-optimal from a firmware efficiency perspective. Firmware efficiency, in at least some embodiments, encompasses firmware storage efficiency and firmware performance efficiency, but those of ordinary skill in the field of firmware architecture will appreciate that firmware efficiency may encompass more and/or different parameters.

Any one or more of the FVs 110 illustrated in FIG. 1 may contain binary code for one or more drivers and/or modules generically referred to herein as firmware modules or, more simply, modules 120. For the sake of clarity and brevity, FIG. 1 illustrates just two modules 120, including a first module 120-1 stored in FV1 110-1 and a second module 120-2 stored in FV3 110-3.

A firmware module, such as first module 120-1 of FIG. 1, may require or otherwise depend upon one or more other modules, such as second module 120-2, to function properly. This type of inter-module relationship is commonly referred to as a dependency. When such a dependency is present, the dispatch of the FV containing first module 120-1, i.e., FV1 110-1, may be deferred until the FV containing second module 120-2, i.e., FV3 110-3 is dispatched. Another type of firmware dependency, sometimes referred to as a library dependency, may occur when one or more of the firmware volumes 120 require the presence of and/or access to a common library. In addition, drivers associated with UEFI boot phases, including PEI drivers, DXE drivers, System Management Mode (SMM) drivers, etc. may have dependent modules distributed across the different firmware volumes.

In the context of transforming or otherwise evolving legacy firmware to a next-generation firmware paradigm such as USF, dependencies represent transformation complexity or, more simply, complexity that increases the time, effort, and cost required to fully implement a transformation. For many modern information handling systems, the extent or magnitude of dependency complexity may effectively prevent or render infeasible any manual transformation approach. Anecdotal evidence suggests that the effort required to manually transform legacy firmware for a single line of business of an information handling system OEM such as Dell Technologies would require multiple man years.

Another type of firmware complexity depicted in FIG. 1 is a duplicative resource complexity that occurs when a module, library, or like type of resource is duplicated in two or more firmware volumes. The duplicated Secure Docket Layer (SSL) libraries 130-1 and 130-2 depicted in FIG. 1 illustrate an example of a duplicated resource complexity. For UEFI/FFS embodiments of legacy firmware 100, additional sources of transformation complexity might include various UEFI constructs such as platform configuration databases (PCDs) PEI-to-DXE handoff blocks (HOBs), etc. Those of ordinary skill will readily appreciate that such firmware complexities present an effectively insurmountable barrier to manual firmware transformation.

Figure 2:
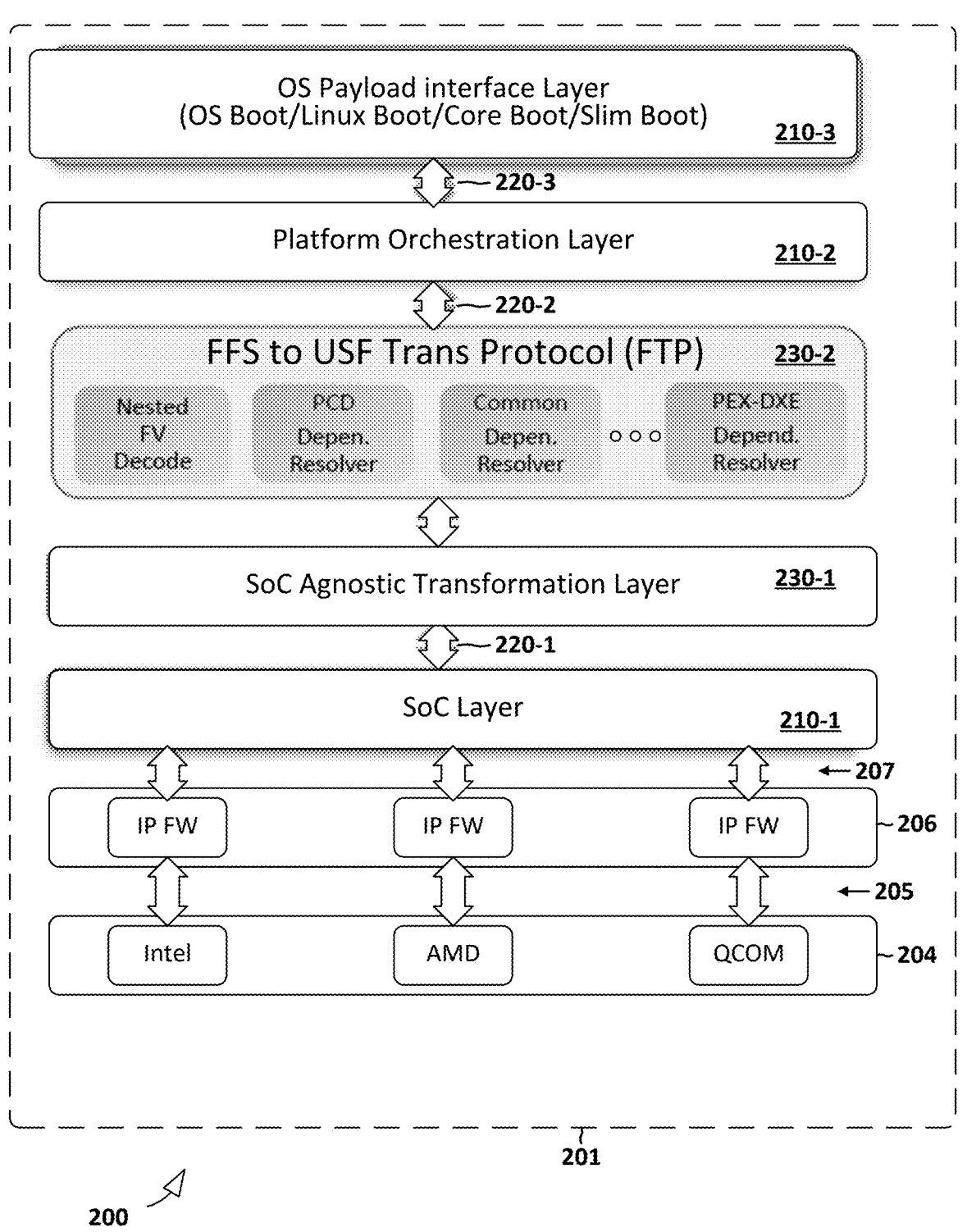
FIG. 2 illustrates a firmware transformation framework in accordance with disclosed subject matter.

Referring now to FIG. 2, therein depicted are architectural elements of a firmware transformation framework (FTF) 201 implemented in an information handling system 200. In at least one embodiment, the FTF 201 illustrated in FIG. 2 is suitable for performing firmware transformation as disclosed herein, i.e., generating USF-compliant firmware based on a pre-existing legacy firmware image installed on information handling system 200. In at least one embodiment of substantial commercial significance, the legacy firmware for information handling system 200 is legacy UEFI firmware including FFS-based firmware volumes, i.e., firmware volumes formatted in compliance with the FFS specification.

The FTF 201 depicted in FIG. 2 integrates transformation layers 230, providing firmware transformation logic in accordance with disclosed subject matter, within USF-defined abstraction layers 210 and APIs 220 to realize an automated firmware transformation engine for generating a USF firmware image based on a legacy UEFI image.

The USF-defined abstraction layers 210 and APIs 220 depicted in FIG. 2 include an SoC Abstraction Layer 210-1, a platform orchestration layer 210-2, and an OS payload interface layer 210-3. Each abstraction layer 210 and API 220 may be implemented partially or entirely in accordance with corresponding USF-standard abstraction layers and APIs. The illustrated SoC Abstraction Layer 210, encompassing vendor-specific or "IP" hardware and firmware, is abstracted from IP hardware layer 204, IP hardware APIs 205, IP firmware 206, and IP firmware APIs 207.

An SOC API 220-2 enables Platform Orchestration Layer (POL) 210-2 to invoke IP hardware interfaces 205 and IP firmware interfaces 207 for any silicon specific work. POL 210-2 produces a Universal Payload API 220-3 to launch the payload environment along with industry standard tables, such as SMBIOS and ACPI tables (not explicitly depicted in FIG. 2).

The OS Payload interface layer 210-3 may support various heterogeneous payloads including OS Boot, LinuxBoot, CoreBoot and Slim Boot embedded hypervisor, plus support for various bootloaders such as tianocore/EDKII, coreboot, slim bootloader, and u-boot.

The system 200 depicted in FIG. 1 includes an SOC-agnostic Transformation Layer 230-1 configured to dynamically integrate firmware packages from various silicon/hardware providers, e.g., Intel, AMD, etc., over an OEM Embedded Abstraction Module to ensure USF compatibility across various heterogeneous boot loaders.

The system 200 of FIG. 2 further includes an FTP 230-2 in accordance with disclosed subject matter. In at least one embodiment, FTP 230-2 is configured to dynamically learn the offline FFS structure of a particular platform and to evaluate the boot time load and link dependencies to provide seamless transformation from traditional FFS.

Figure 3:
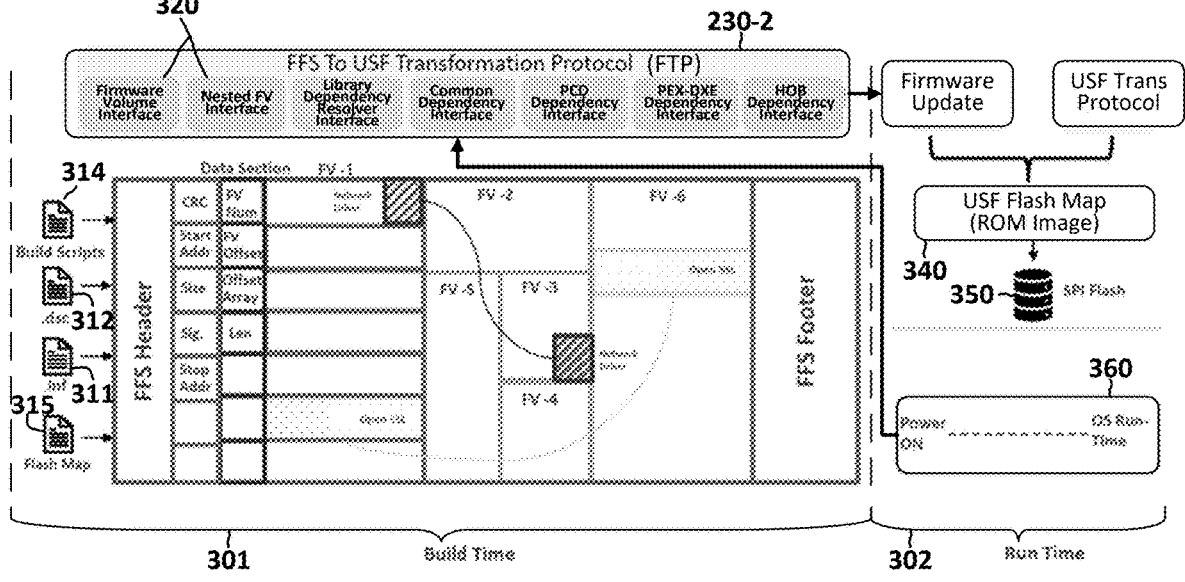
FIG. 3 illustrates build time and runtime phases of the firmware transformation framework.

Referring now to FIG. 3, in at least some embodiments, the FTP 230-2 of FIG. 2 facilitates seamless transformation from FFS to USF in two phases: a Build Time phase 301 and a Run Time (RT) phase 302. During the Build Time phase 301 depicted in FIG. 3, FTP 230-2 may retrieve or otherwise access legacy firmware information 305. Legacy firmware information 305 may include, as examples, binary files (not explicitly depicted in FIG. 3), build information (INF) files 311, platform description (DSC) files 312, build scripts 314, and an FFS Flash Map 315.

Invoking multiple transformation interfaces 320, FTP 230-2 may resolve dependencies, eliminate one or more duplicate libraries, and perform firmware updates 330 to produce an optimized USF-compliant flash map 340. FTP 230-2 may then access flash map 340 to generate USF-compliant firmware and flashes it to SPI Flash 350. The STP 230-2 of FIG. 3 includes a plurality of complexity handling interfaces 320 including, in the depicted embodiment, a firmware volume interface, a nested firmware volume interface, a library dependency interface, a common module dependent interface, a platform configuration database (PCD) interface, a dependency interface, and a hand off block (HOB) dependency interface.

In runtime phase 302, FTP 230-2 may utilize previously collected statistics obtained during platform boot up, learning dependencies throughout the boot sequence 360, from power on to OS runtime. At different checkpoints during runtime phase 302, dependency and duplicate library statistics may be gathered. This statistical information may then be provided to FTP 230-2 to dynamically generate a runtime USF-compliant flash map 340, sometimes referred to as a ROM image.

Figure 4:
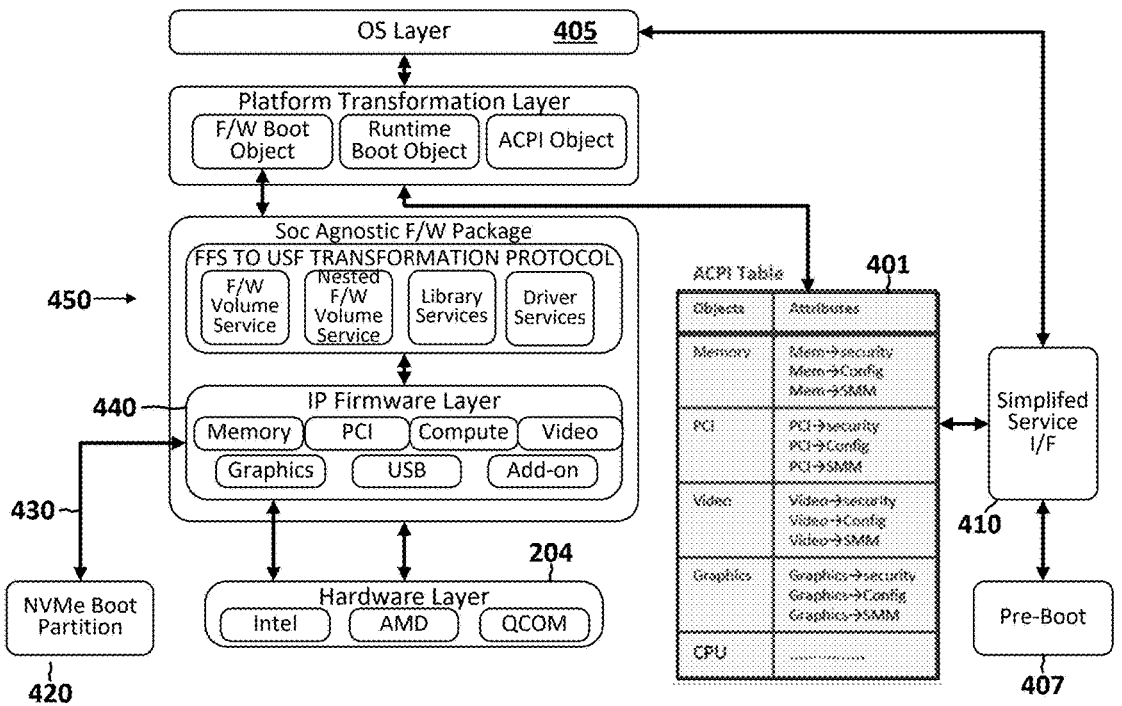
FIG. 4 illustrates a simplified service interface to support split architecture, multi-store flash images.

Referring now to FIG. 4, an ACPI table 401 is depicted couple to an interface referred to herein as simplified ACPI interface (SAI) 410. SAI 410 may be configured to ensure USF interface support for multi-store flash images for update, recovery, and boot. SSI 410 may enable access to ACPI table 401 from within OS layer 405 as well as from within a pre-boot phase 407. At least some embodiments of SSI 410 may also be used to communicate with an Embedded Controller (EC) (not depicted in FIG. 4).

AN NVMe boot partition 420 and Virtual SPI bus 430 may interact with IP firmware layer 440 through a split capable unified API 450, to perform multi-store flash images for update, recovery and reboot of the platform.

Referring now to FIG. 5, a firmware transformation method 500 in accordance with disclosed teaching is depicted. Method 500 may be performed, in at least some use cases, by an information handling system in which legacy firmware is disclosed. The method 500 illustrated in FIG. 5 includes accessing (operation 502) legacy firmware information corresponding to a legacy firmware of an information handling system. One or more firmware complexities in the legacy firmware may be determined (operation 504) based, at least in part, on the legacy firmware information. The illustrated method 500 may then invoke (operation 506) a USF transformation protocol to identify one or more of the legacy firmware resource complexities and generate USF-compliant firmware to resolve at least one of the firmware complexities. The illustrated method 500 may then store (operation 510) an image of the USF firmware in nonvolatile storage of the information handling system.

Referring now to FIG. 6, any one or more of the elements illustrated in FIG. 1 through FIG. 4 may be implemented as or within an information handling system exemplified by the information handling system 600 illustrated in FIG. 6. The illustrated information handling system includes one or more general purpose processors or central processing units (CPUs) 601 communicatively coupled to a memory resource 610 and to an input/output hub 620 to which various I/O resources and/or components are communicatively coupled. The I/O resources explicitly depicted in FIG. 6 include a network interface 640, commonly referred to as a NIC (network interface card), storage resources 630, and additional I/O devices, components, or resources 650 including as non-limiting examples, keyboards, mice, displays, printers, speakers, microphones, etc. The illustrated information handling system 600 includes an embedded controller EC 660 which may provide or support various system management functions and, in at least some implementations, keyboard controller functions. Exemplary system management functions that may be supported by EC 660 include thermal management functions supported by pulse width modulation (PWM) interfaces suitable for controlling system fans, power monitoring functions supported by an analog-to-digital (ADC) signal that can be used to monitor voltages and, in conjunction with a sense resistor, current consumption per power rail. This information could be used to, among other things, monitor battery charging or inform the user or administrator of potentially problematic power supply conditions. EC 660 may support battery management features to control charging of the battery in addition to switching between the battery and AC adapter as the active power source changes or monitoring the various battery status metrics such as temperature, charge level and overall health. EC 660 may support an Advanced Configuration and Power Interface (ACPI) compliant OS by providing status and notifications regarding power management events and by generating wake events to bring the system out of low power states.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. A method comprising:
   accessing legacy firmware information corresponding to legacy firmware suitable for an information handling system;
   determining, based at least in part on the legacy firmware information, one or more firmware complexities of the legacy firmware;
   invoking a universal scalable firmware (USF) transformation protocol to identify the one or more firmware complexities of the legacy firmware and generate USF firmware, wherein the USF firmware complies with a USF specification and resolves at least some of the firmware complexities of the legacy firmware; and
   storing an image of the USF firmware in nonvolatile storage of the information handling system.

2. The method of claim 1, wherein the legacy firmware comprises firmware file system (FFS) firmware including one or more FFS firmware volumes formatted in compliance with a UEFI FFS and wherein the USF firmware includes one or more USF firmware volumes formatted in compliance with a USF specification.

3. The method of claim 2, further comprising performing runtime operations comprising:
   during execution of the boot sequence, gathering runtime dependency information;
   applying the USF transformation protocol operations to dynamically generate runtime USF firmware image; and
   storing the runtime USF firmware image in system memory.

4. The method of claim 2, wherein the one or more firmware complexities include one or more firmware module dependencies wherein a first module in a first firmware volume depends on a second module in a second firmware volume.

5. The method of claim 2, wherein the one or more firmware complexities include one or more duplicated firmware libraries and wherein the USF firmware omits at least one of the duplicated firmware libraries.

6. The method of claim 2, wherein the one or more firmware complexities include one or more nested firmware volumes within the FFS firmware volumes.

7. The method of claim 2, wherein the legacy firmware information includes any one or more of:
   one or more binary files;
   one or more platform description (DSC) files;
   one of more module information (INF) files; and
   an FFS flash map.

8. The method of claim 2, wherein the USF transformation protocol includes a plurality of interfaces including any one or more of:

a firmware volume interface;

a nested firmware volume interface;

a library dependency interface;

a common module dependent interface;

a platform configuration database (PCD) interface;

a dependency interface; and a hand off block (HOB) dependent interface.

9. The method of claim 1, further comprising:

invoking a vendor-agnostic abstraction layer to abstract common silicon objects from IP hardware.

10. The method of claim 1, further comprising:

determining hardware objects and attributes of the system by accessing an Advanced confirmation and Power Interface (ACPI) via a simplified service interface.

11. An information handling system, comprising:

a central processing unit (CPU); and a system memory, coupled to the CPU, including processor-executable instructions that, when executed by the processor, cause the system to perform operations including:

accessing legacy firmware information corresponding to legacy firmware suitable for an information handling system;

determining, based at least in part on the legacy firmware information, one or more firmware complexities of the legacy firmware;

invoking a universal scalable firmware (USF) transformation protocol to identify the one or more firmware complexities of the legacy firmware and generate USF firmware, wherein the USF firmware complies with a USF specification and resolves at least some of the firmware complexities of the legacy firmware; and storing an image of the USF firmware in nonvolatile storage of the information handling system.

12. The information handling system of claim 11, wherein the legacy firmware comprises firmware file system (FFS) firmware including one or more FFS firmware volumes formatted in compliance with a UEFI FFS and wherein the USF firmware includes one or more USF firmware volumes formatted in compliance with a USF specification.

13. The information handling system of claim 12, further comprising performing runtime operations comprising:

during execution of the boot sequence, gathering runtime dependency information;

applying the USF transformation protocol operations to dynamically generate runtime USF firmware image; and storing the runtime USF firmware image in system memory.

14. The information handling system of claim 12, wherein the one or more firmware complexities include one or more firmware module dependencies wherein a first module in a first firmware volume depends on a second module in a second firmware volume and wherein the USF firmware resolves the module dependencies.

15. The information handling system of claim 12, wherein the one or more firmware complexities include one or more duplicated firmware libraries and wherein the USF firmware omits at least one of the duplicated firmware libraries.

16. The information handling system of claim 12, wherein the one or more firmware complexities include one or more nested firmware volumes within the FFS firmware volumes.

17. The information handling system of claim 12, wherein the legacy firmware information includes any one or more of:

one or more binary files;

one or more platform description (DSC) files;

one of more module information (INF) files; and an FFS flash map.

18. The information handling system of claim 12, wherein the USF transformation protocol includes a plurality of interfaces including any one or more of:

a firmware volume interface;

a nested firmware volume interface;

a library dependency interface;

a common module dependent interface;

a platform configuration database (PCD) interface;

a dependency interface; and a hand off block (HOB) dependent interface.

19. The information handling system of claim 11, further comprising:

invoking a vendor-agnostic abstraction layer to abstract common silicon objects from IP hardware.

20. The information handling system of claim 11, further comprising:

determining hardware objects and attributes of the system by accessing an Advanced confirmation and Power Interface (ACPI) via a simplified service interface.

* * * * *